Sept. 22, 1931.  W. D. HAILES  1,824,136
DIRECT CURRENT TRACK RELAY FOR RAILWAY SIGNALING SYSTEMS
Filed Oct. 15, 1930

INVENTOR
W. D. Hailes,
BY Neil D. Preston,
his ATTORNEY

Patented Sept. 22, 1931

1,824,136

UNITED STATES PATENT OFFICE

WILLIAM D. HAILES, OF ROCHESTER, NEW YORK, ASSIGNOR TO GENERAL RAILWAY SIGNAL COMPANY, OF ROCHESTER, NEW YORK

DIRECT CURRENT TRACK RELAY FOR RAILWAY SIGNALING SYSTEMS

Application filed October 15, 1930. Serial No. 488,901.

This invention relates to direct current track circuits for railroads, and more particularly to a relay for such track circuits.

In the application of track circuit control to railway signaling, and this is particularly true in single track signaling of the absolute-permissive-block type, it is very important that the track relays, should be quick dropping and slow picking up. A track relay of the ordinary construction is apparently slow dropping and comparatively quick in picking up, this because dropping of the relay due to the entrance of a train upon the track circuit is caused by shunting the main coil of the relay, and this coil when shunted acts as a slug or short circuited winding which maintains the flux in the relay for an appreciable period of time. The reason why slow dropping of a relay and quick picking up of a relay is undersirable for controlling wayside signals by track circuits, is because if a short train moves from one track circuit upon another track circuit it is possible that the track circuit cleared will have its relay picked up before the track relay of the track circuit being occupied has had time to drop, so that the result is a momentary period where both of these track circuits manifest clear traffic conditions, which may actually cause the next signal in the rear to momentarily indicate clear, and in the case of single track signaling where stick relays are employed may actually effect picking up or the dropping of a stick relay and thereby reverse the direction of traffic set up.

In view of the above and other important considerations it is proposed in accordance with the present invention to employ an auxiliary magnet in the track relay which is only energized when a change of current in the track circuit takes place, and in accordance with the particular embodiment of the invention illustrated this energization of the auxiliary magnet is accomplished by magnetic induction.

Other objects, purposes and characteristic features of the present invention will in part be obvious from the accompanying drawings and will in part be more specifically described hereinafter.

Figure 2:
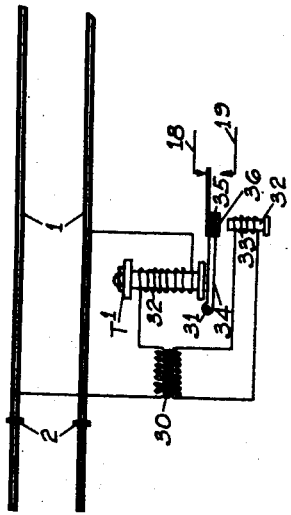
Figure 1:
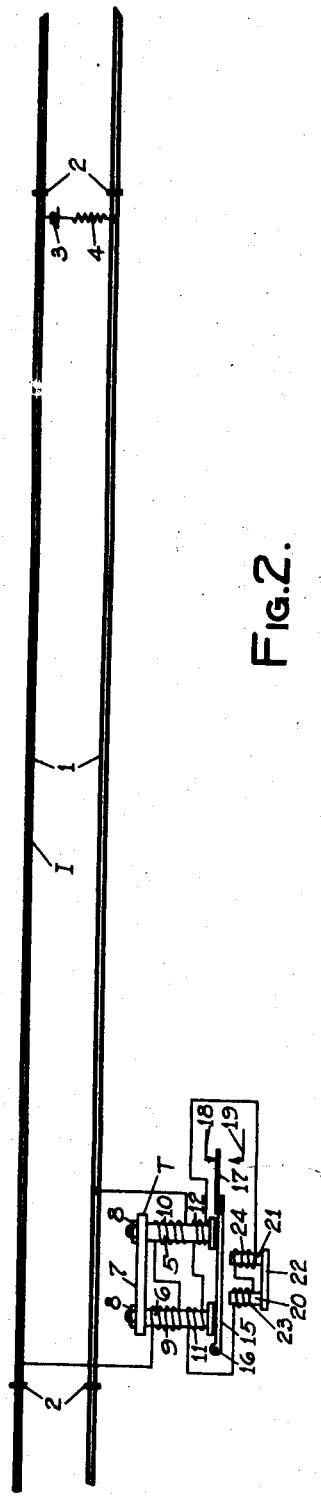

In describing the invention in detail reference will be made to the accompanying drawings, in which;

Fig. 1 illustrates a track circuit having a relay embodying the present invention contained therein; and Fig. 2 shows a portion of a track circuit employing a relay of modified construction.

Referring to the drawings the track rails 1 are divided by insulating joints 2 into blocks, of which only the block I has been illustrated, this block I includes the usual track battery 3 and series resistance 4 and a track relay T embodying the present invention. In the embodiment of the invention illustrated in Fig. 1 the track relay T comprises the usual soft iron cores 5 and 6 bolted to the back yoke 7 by nuts 8 threaded on reduced extensions of the cores 5 and 6, the other end of these cores 5 and 6 terminating in the usual pole pieces. This core structure is provided with main coils 9 and 10 connected in series to be cumulative and auxiliary coils 11 and 12 also connected in series to be cumulative. The relay T includes the usual soft iron armature 15 pivoted at 16 and having fastened thereto but insulated therefrom a contact 17 adapted to engage the front contact 18 or the back contact 19 conventionally shown by arrows. Below the armature 15 is provided, what may be called a "pull-down magnet" of any suitable construction, and as shown comprises the cores 20 and 21, back yoke 22 and coils 23 and 24 connected cumulatively in series. This pull-down magnet 20—24 has its coils connected in series with the auxiliary coils 11 and 12 of the main core structure of the relay T, so that any change in magnetic flux in the main core induces a current in the circuit including coils 11, 12, 23 and 24 in series thereby producing a downward magnetic pull upon the armature 15.

The various parts of the relay T are so designed that even though the current induced in the pull-down magnet 20—24 is comparatively small it will produce an appreciable effect on the operation of the armature 15. It is readily apparent that the movement of a train from left to right into the block I will shunt the main coils 5 and 6 of the relay T and thereby cause a sudden decrease in the flux passing through the auxiliary coils 11 and 12, and this decrease in flux will induce a current in the closed circuit including coils 11, 12, 23 and 24, so that the pull-down magnet 20—24 is momentarily energized. The magnetism emitted by the pull-down magnet 20—24, will, of course, act on the armature 15 tending to pull it to its deenergized position, thereby reducing the time of action of the armature 15 during deenergization of the track relay T. When, on the other hand, the train under consideration passes out of the block I the sudden increase of direct current flowing to the main coils 9 and 10 of the relay T will induce a current in the pull-down magnet 20—24 thereby holding the armature 15 in its retracted position until the current in the pull-down magnet 20—24 has substantially died down to a zero value. By reason of the fact that the magnetic circuit of the pull-down magnet is substantially closed during the period when the armature 15 assumes its retracted position, the effect of the pull-down magnet 20—24 is very pronounced to retard picking up of the armature 15, whereas during deenergization of the track relay T the effect of the pull-down magnet 20—24 is less pronounced.

In order to transfer more energy to the pull-down magnet, this pull-down magnet may be connected to the secondary winding of a transformer of the closed core type, such as the transformer 30 as shown in Fig. 2. The track relay $T^1$ shown in Fig. 2 of the drawings has the axis of its pivot 31 arranged parallel to the two legs 32 (only one of which has been shown) of the relay core, in conformity with the usual construction of track relays of the direct current type. In order to multiply the effect of the pull-down magnet comprising cores 32 and coil 33 shown in Fig. 2 of the drawings especially in so far as picking up of the relay $T^1$ is concerned, the armature 34 is provided with an extension 35 preferably comprising non-magnetic metal, such as brass, to the end of which is fastened an armature 36 adapted to be attracted by the pull-down magnet 32—33. In this construction, although the effect of the pull-down magnet 32—33 is not materially increased in so far as operation of the operation of the armature 34 to its retracted position is concerned the action of the pull-down magnet 32—33 to prevent quick picking up of the armature 34 is materially increased, this because the armature 36 affords a material leverage advantage through which the armature 36 may hold the armature 34 in its retracted position.

Applicant has thus illustrated several embodiments of his novel track relay, which is provided with inductive means for preventing quick picking up of the armature of such relay, and which inductive means increases the speed of retraction of the armature upon deenergization of such relay, in Fig. 1 the energy of induction is derived from the main core structure of the relay, whereas in the arrangement shown in Fig. 2 the energy is derived inductively from the stored energy in the closed core of transformer 30.

Having thus shown and described several embodiments of the present invention, it is desired to be understood that the particular embodiments of the invention illustrated have been selected for the purpose of facilitating disclosure and description thereof, and have not been selected for the purpose of illustrating the exact construction preferably employed in practicing the invention nor have they been illustrated to show the scope of the invention, and it is to be understood that various changes, modifications and additions may be made to adapt the invention to the particular problem encountered in practicing the same, all without departing from the spirit or scope of the invention or the idea of means underlying the same, except as demanded by the scope of the following claims.

What I claim as new is:—

1. In a track circuit for railway signaling, the combination with a track circuit source, and a track relay in series therewith including a main coil and an auxiliary coil opposing the action of said main coil and inductively coupled with said main coil.

2. In a relay, the combination with electromotive power means, of a circuit for energizing said means, a movable contact operated by said means, a second electro-motive power means which if energized opposes the action of said first mentioned electro-motive power means, and a closed circuit for energizing said second electro-motive power means inductively coupled to said first mentioned circuit.

3. In a relay, the combination with electro-responsive means, of a circuit for energizing said means, a movable contact operated by said means, a second electro-responsive means which if energized opposes the action of said first mentioned electro-responsive means, and a closed circuit for energizing said second electro-responsive means inductively coupled to said first mentioned circuit.

4. In a relay, the combination with a movable contact biased to its inactive position, of an electro-magnet for operating said contact to its active position, a circuit for energizing said electro-magnet, a second electro-magnet for urging said contact toward its inactive position, and a circuit for said second electro-magnet inductively coupled to said first mentioned circuit.

5. In a relay, the combination with a movable contact biased to its inactive position, of an electro-magnet for operating said contact to its active position, a circuit for energizing said electro-magnet, a second electro-magnet for urging said contact toward its inactive position, and a circuit for said second electro-magnet inductively coupled to said first mentioned electro-magnet.

6. In a relay, the combination with an armature biased to its inactive position, of an electro-magnet for operating said armature to its active position, a circuit for energizing said electro-magnet, a second electro-magnet for urging said armature toward its inactive position, and a circuit for said second electro-magnet inductively coupled to said first mentioned circuit.

7. In a relay, the combination with an armature biased to its inactive position, of an electro-magnet for operating said armature to its active position, a circuit for energizing said electro-magnet, a second electro-magnet for urging said armature toward its inactive position, and a circuit for said second electro-magnet inductively coupled to said first mentioned electro-magnet.

8. A track circuit for railways comprising, an insulated track section, a battery between the rails at one end of said section, a track relay having an armature and connected between the rails at the other end of said section, a pull-down electro-magnet for urging the armature of said relay to its retracted position, and means for energizing said pull-down coil only upon each change of current flow in said relay.

9. A track circuit for railways comprising, an insulated track section, a battery between the rails at one end of said section, a track relay having an armature and connected between the rails at the other end of said section, a pull-down electro-magnet for urging the armature of said relay to its retracted position, and means inductively coupled to the circuit of said relay to energize said pull-down electro-magnet only upon each change of current flow in said circuit.

10. A track circuit for railways comprising, an insulated track section, a battery between the rails at one end of said section, a track relay having an armature and connected between the rails at the other end of said section, a pull-down electro-magnet for urging the armature of said relay to its retracted position, and means inductively coupled to said relay to energize said pull-down electro-magnet only upon each change of current flow in said circuit.

11. A track circuit for railways comprising, an insulated track section, a battery between the rails at one end of said section, and a track relay comprising, an armature, a main coil for lifting said armature, and an auxiliary coil for retracting said armature and inductively coupled to said main coil.

In testimony whereof I affix my signature.

WILLIAM D. HAILES.